United States Patent Office 3,341,497
Patented Sept. 12, 1967

3,341,497
ORGANIC SOLVENT SOLUBLE PERFLUOROCARBON COPOLYMERS
Patsy O. Sherman, Bloomington, and Samuel Smith, Roseville, Minn., assignors to Minnesota Mining and Manufacturing Company, St. Paul, Minn., a corporation of Delaware
No Drawing. Filed Jan. 21, 1966, Ser. No. 522,058
9 Claims. (Cl. 260—72)

This application is a continuation-in-part of our prior and copending application S.N. 194,175, filed May 11, 1962, now abandoned.

This invention relates to the preparation of organic solvent soluble resins containing a perfluoro "tail." These resins of this invention are particularly useful in imparting water and oil repellency characteristics of fluorocarbons to surfaces treated with these compositions. In another aspect this invention relates to thermosetting organic solvent soluble oleophobic compositions.

Some fluorochemicals are well known for their ability to impart both olephobic and hydrophobic characteristics to surfaces which have been treated with these materials. In this invention, a perfluorocarbon terminal portion or tail is incorporated in an organic solvent soluble copolymer, preferably a precondensate capable of being cured with heat. As such, the usefulness of the fluorocarbon technology is extended into a new field.

We have discovered that a fluorinated random copolymer can be produced which is oleophobic (renders a treated surface oleophobic) and soluble in nonfluorinated organic solvents if the fluorine content of the appendant perfluorocarbon tails or terminal portions of the copolymer represents at least 1 percent and less than 40 percent by weight of the copolymer and if the backbone or base chain of the copolymer is substantially entirely carbon with at least half, preferably at least three-fourths, of the substituents being hydrogen and/or a radical having an unsubstituted alkyl group of not greater than 6 carbon atoms. Preferably at least half the carbon atoms of the backbone contain only hydrogen substituents. The divalent radical linking the terminal radical containing the perfluorocarbon tail or any other appendant organic radical to the backbone is usually an ester radical but may be an alkylene radical, an arylene radical, a ketone radical or oxygen, or may be directly connected to the carbon of the backbone, without departing from the scope of this invention, preferably the perfluorocarbon tail is a monovalent perfluorocarbon radical of at least 4 carbon atoms, and is preferably an acyclic alkyl radical. Linear copolymers of the above type are soluble in non-halogenated organic solvents up to about 20 weight percent solids or higher, for example in butanol or xylene or mixtures thereof, and contain sufficient fluorine in the proper structural form to render the copolymers oleophobic.

The molecular weight of the homogeneous copolymers of the present invention can be varied between about 20,000 and about 500,000 or higher. For application to rigid surfaces, copolymers of a molecular weight less than about 200,000 are generally utilized and for application to fabrics and other flexible surfaces copolymers of a molecular weight above about 200,000 are generally utilized.

We have also discovered that precondensate interpolymers of the above structure and fluorine content formed of at least 3 monomers, one of which is reactable with formaldehyde, comprising (1) about 2 to about 50 percent by weight of monomeric units of $R_fP$, where $R_f$ is a perfluorocarbon radical, preferably a perfluoroalkyl radical, containing at least 4 carbon atoms and P is a polymerizable group containing terminal ethylenic unsaturation, (2) at least about 1, preferably at least 5, and not more than about 25 percent by weight of monomeric units of a monomer containing a functional grouping such as a radical containing active hydrogen reactable with fomaldehyde and (3) about 25 to about 97 percent by weight of monomeric units of a terminally ethylenically unsaturated monomer free of active hydrogen and non-vinylic fluorine are useful for this purpose and have the numerous advantages set forth in this specification. These precondensates may then be reacted with an aldehyde to form the thermosetting resins.

Monomers of (2) above which are reactable with formaldehyde to form suitably active methylolated derivatives are selected from the class of ethylenically unsaturated monomers containing either amide, amine, urea or hydroxyl groups. Representative compounds of these classes are:

A. *Amides.*—Acrylamide, methacrylamide, N - methyl acrylamide, N-tertiary butyl acrylamide, cinnamic acid amide, and the mono- and diamide derivatives of maleic, fumaric, itaconic and citraconic acids.

B. *Alcohols.*—Methyl alpha-methylol acrylate, beta-hydroxyethyl acrylate, beta-hydroxyethyl alpha-chloroacrylate and beta-hydroxypropyl methacrylate.

C. *Amines.*—N-tertiary butyl aminoethyl methacrylate and beta-aminoethyl vinyl ether.

D. *Ureas.*—Beta-ureidoethyl vinyl ether.

The general structural formula of the preferred fluorine-containing monomers of (1) above is $R_fP$, where $R_f$ is a perfluoroalkyl radical preferably of the formula $C_nF_{2n+1}$, where $n$ is at least 4 and less than 20 (most preferably 5 to 10) and P is a radical containing a monoethylenically terminally unsaturated polymerizable group.

The preferred polymerizable groups, P, of the above formula contain an ethylenic group in conjugation with a carbonyl group. Illustrative types of these fluorine-containing monomers are the acrylate, methacrylate and alpha-chloroacrylate esters of N-alkanol perfluoroalkane sulfonamides, 1,1-dihydroperfluoroalkanols, omega-perfluoroalkylalkanols and 1,1,3-trihydroperfluoroalkanols, 1,1-dihydroperfluoroalkyl acrylamides, vinyl perfluoroalkyl ketones and allyl perfluoroalkyl ketones.

Other useful fluorine-containing monomers of the $R_fP$ type are 1,1-dihydroperfluoroalkyl vinyl ethers, 2-perfluoroalkyl ethylene, 1,1 - dihydroperfluoroalkene-1, perfluoroalkyl substituted styrenes, and vinyl and allyl esters of perfluoroalkanoic acids.

Illustrative ethylenically unsaturated monomers of (3) above which may be employed with the above formaldehyde reactable monomers (2) and fluorine-containing monomers (1) are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, ring halogenated styrenes, acrylic acid and alkyl esters thereof, methacrylic acid and alkyl esters thereof, alpha-choloracrylic acid and alkyl esters thereof, methacrylonitrile, vinyl carbazole, vinyl pyrrolidone, vinyl pyridine, vinyl alkyl ethers, vinyl alkyl ketones, butadiene, chloroprene, fluoroprene and isoprene. The preferred monomers of this class are the mono-unsaturated monomers, such as the alkyl acrylates and methacrylates in which the alkyl group contains not more than 4 carbon atoms.

In one embodiment of this invention the above three classes of monomers are initially polymerized to form a precondensate which is then reacted with an aldehyde to form a thermosetting resin. In this manner, a fluorocarbon thermosetting resin having an

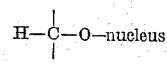

in which one of the carbon bonds of the

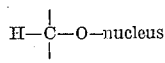

is attached to oxygen or nitrogen is prepared. The other carbon bond is attached to hydrogen when formaldehyde is the aldehyde employed or an organic radical when some other aldehyde is used. The oxygen atom of the nucleus is attached to hydrogen or an alkyl radical. The nuclei may also be represented by the structural formulae:

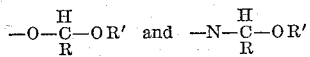

where R is hydrogen or an organic radical and R' is hydrogen or an alkyl radical.

In the polymerization, the combined monomers are dissolved in a solvent at a concentration of about 15 to about 70 percent by weight. Preferred solvents for the preparation of the interpolymer are ones in which all the monomer components and polymer are soluble. Isopropyl alcohol, n-butyl alcohol, xylene, ethyl acetate and dimethoxyethane are exemplary of especially useful solvents that may be used alone, or in combination. Relatively low boiling solvents, such as isopropyl alcohol, permit moderation of the reaction where desired.

A polymerization temperature of between about 25 and about 150° C. may be employed, the preferred range being between about 60 and about 120° C. The reaction may be carried out for any desired length of time, generally 1 to 4 hours, in the absence of oxygen, preferably under a nitrogen blanket.

A peroxygen catalyst is usually employed as the polymerization initiator at a concentration of from 0.1 to 4.0 percent by weight of the reaction mixture. Suitable catalysts are benzoyl peroxide, lauroyl peroxide, acetyl peroxide, cyclohexanone peroxide, tertiary butyl peroxide, p-menthane hydroperoxide, tertiary butyl hydroperoxide and cumene hydroperoxide. Azo-catalysts, such as azobisisobutyronitrile, may also be employed.

When it is desired to produce a solution of high solids content and of relatively low viscosity suitable for coating purposes, the use of a chain modifying agent may be desired to control the molecular weight. Preferred modifying agents are octyl mercaptan, decyl mercaptan, n- or tertiary-dodecyl mercaptan usually in the concentration range of 0.3-3 percent. Other modifying agents which may be used are allyl acetate, pentachloroethane, trichlorobromomethane and cumene. It is usually desirable to add the initiator portion-wise to a mixture of all other ingredients at the desired reaction temperature, in order to moderate the highly exothermic reaction. Further moderation of the reaction can be achieved by the use of a relatively low boiling compound as one component of the solvent mixture. Such compounds as acetone, ethyl acetate or isopropyl alcohol may be used for this purpose.

Aldehydes which can be used in this invention include formaldehyde, acetaldehyde, butyraldehyde and furfural. Formaldehyde, the preferred aldehyde, can be employed in the form of paraformaldehyde, hexamethylene tetramine or as an alcohol or water solution. The alcohol solution of formaldehyde, particularly the n-butanol solution containing about 40 percent aldehyde, is the preferred material for reaction with the precondensate resin. It is usually desirable to use at least 1.7 moles of formaldehyde per mole of formaldehyde-reactable monomer, although amounts ranging from 0.4-3.0 equivalents can be used. An illustrative condensation product prepared from a butanol solution of formaldehyde with a precondensate resin containing acrylamide units contains the following unit structure:

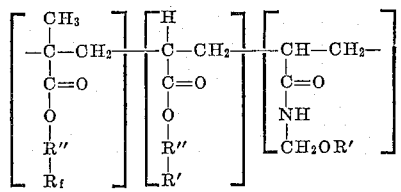

where R'' is an organic linking radical containing at least one methylene radical, R' is hydrogen or an alkyl radical of 1 to 4 carbon atoms, $R_f$ is a perfluoroalkyl radical of 4 to 10 carbon atoms. An acid catalyst should generally be used in this reaction to increase both the rate of methylolation and the proportion of protected pendant alkyl ether linkages to methylol groups.

The reaction of the precondensate resin with an aldehyde, preferably formaldehyde, yields an active carbinol compound which can be applied to any surface and then subsequently heat hardened to a tough resinous coating having extremely useful surface properties. Although the reaction of aldehyde with the precondensate resin is the preferred means of achieving the result of this invention, it is contemplated that comparable results may be obtained by reacting the aldehyde with a suitable monomer. The resulting active methylolated monomer, e.g., N-methylol acrylamide, can then be used as one of the components in the preparation of the interpolymers of this invention.

It is contemplated that the hardening (i.e., thermosetting) of the resin with heat proceeds by the condensation of carbinol groups (or their alkyl ethers as set forth above) with groups containing active hydrogen so as to form methylene bridges as the crosslink groups and liberate water, or alcohol where the active group is in the form of the protected alkyl ether. Butylated methylol groups have far greater stability, and thus present less danger of premature gelation than the same resin containing unprotected methylol groups.

The thermosetting random copolymer resin is preferably prepared as a 40–60 percent by weight resin in an organic solution having a Gardner-Holdt viscosity range of N–Z. Useful organic solutions of the resins of this invention have been made in the H–$Z_4$ range. With the thermosettable resin solutions in the lower range the final heat hardened films tend to be brittle, while in the upper range it is very difficult to apply a uniform coating. In the viscosity range of about H–T which may be obtained by dilution, if the product is of higher viscosity initially, the resin organic solution can be readily applied to a variety of surfaces by flow-coating, dip-coating or spraying techniques.

The curing is carried out by heating the coated surface for 10 minutes to 10 hours at a temperature between about 75 and about 200° C. An acid catalyst, such as 0.1–1.0 percent of oxalic acid, trichloroacetic acid or phosphoric acid may be added to the solution before application to the surface if shorter cure times at lower temperatures are required. For instance, the addition of 0.5 percent by weight phosphoric acid may be expected to produce a 30 minute cure at 90° C. which is equivalent to an uncatalyzed 30 minute cure at 170° C.

*Example I*

A 3-neck flask fitted with stirrer, reflux condenser, thermometer and nitrogen inlet tube was charged as follows:

(a) Acrylamide (15 grams)
(b) Ethyl acrylate (55 grams)
(c) $C_8F_{17}SO_2N(C_2H_5)CH_2CH_2OCOC(CH_3)=CH_2$ (30 grams)
(d) n-Butanol (100 grams)
(e) Tertiary-dodecyl mercaptan (3 grams)

Nitrogen purging, stirring and heating of the flask were initiated. After 30 minutes, the temperature was 91° C. Cumene hydroperoxide (0.5 gram) was added and after two hours an equal amount of cumene hydroperoxide was added at which time temperature was 103° C. A mixture of maleic anhydride (0.4 gram) and 40 percent formaldehyde solution in n-butanol (31.5 grams) was added to the reaction flask after another two hours. At the time of this addition, the concentration of precondensate resin in the butanol solvent was 51.3 percent. The reaction mixture was then refluxed for two hours. At the end of this period a Dean-Stark trap was fitted to the reflux condenser to permit removal of butanol and by product water from the reaction mixture. The reflux temperature rose to 114° C. and 55 ml. of liquid was removed over a two hour period. The resulting viscous material was transferred to a bottle and diluted with xylene (55 ml.) to produce a 49 percent solids solution of the fluorocarbon thermosetting resin having a Gardner-Holdt viscosity of N.

The resin was applied to degreased surfaces of glass, aluminum and mild steel using both spread and dipcoating techniques.

The treated surfaces were cured for 30 minutes at 175° C. resulting in a coating having excellent adhesion to all surfaces. Test results for the coatings and a comparable coatings from a nonfluorocarbon control resin were observed.

The control resin was prepared and applied from solution in this same manner as above, except that methyl methacrylate (25 grams) and ethyl acrylate (additional 5 grams) were substituted for the fluorocarbon monomer in the preparation of the polymer. Table I lists the observed experimental results achieved in testing the two cured resins.

TABLE I

| Test | Control Coating | Fluorocarbon Coating | Polytetra-Fluoroethylene |
|---|---|---|---|
| Contact angle (defined in Example II): | | | |
| (1) Hexadecane, deg | 24 | 64 | |
| (2) Distilled water, deg | 83 | 98 | |
| Knoop hardness | 14.1 | 8.2 | |
| Tensile strength (p.s.i.) | 4,720 | 3,060 | |
| Adhesion to unprimed aluminum (p.s.i.) | 15.6 | 15.0 | |
| Adhesion paraffin wax (60° C. melting point) to coating (p.s.i.) | 39.2 | 12.6 | 19.3 |
| Dielectric constant (1 kc. at 25° C.) | 3.81 | 3.26 | |
| Dissipation factor (1 kc. at 25° C.) | 0.0164 | 0.0200 | |

*Examples II to V*

Fluorocarbon containing thermosetting resins were prepared according to the procedure of Example I from the following monomer mixtures and crosslinking compositions except that two parts instead of three parts by weight tertdodecyl mercaptan was used in the polymerization.

Example II.—
Reactant:                                 Parts by weight
   Styrene _____ 55
   Acrylamide _____ 15
   $CF_3(CF_2)_7SO_2N(CH_2CH_2CH_3)CH_2CH_2OCOCH=CH_2$ _____ 30
                                                   100

Crosslinking composition:
   Formaldehyde _____ 12.6
   Maleic anhydride _____ 0.4

Example III.
Reactant:
   Butyl acrylate _____ 35
   Acrylonitrile _____ 30
   Acrylamide _____ 15
   $CF_3(CF_2)_7SO_2N(CH_2CH_3)CH_2CH_2OCOC(CH_3)=CH_2$ _____ 20
                                                   100

Crosslinking composition:
   Formaldehyde _____ 12.6
   Maleic anhydride _____ 0.4

Example IV.—
Reactant:
   Ethyl acrylate _____ 60
   Methyl methacrylate _____ 23
   Acrylamide _____ 15
   $CF_3(CF_2)_6CH_2OCOC(CH_3)=CH_2$ _____ 2
                                                   100

Crosslinking composition:
   Formaldehyde _____ 12.6
   Maleic anhydride _____ 0.4

Example V.—
Reactant:
   Ethyl acrylate _____ 55
   Methyl methacrylate _____ 10
   Methacrylamide _____ 5
   $CF_3(CF_2)_7SO_2N(CH_2CH_3)CH_2CH_2OCOC(CH_3)=CH_2$ _____ 30
                                                   100

Crosslinking composition:
   Formaldehyde _____ 12.6
   Maleic anhydride _____ 0.4

Coatings of these resins were made on polished, degreased aluminum panels from the 50 percent solids in 50–50 butanol-xylene solutions of the resins of Examples No. II and No. V. The resin solutions of Examples No. III and No. IV were diluted with equal volumes of acetone and methyl isobutyl ketone, respectively, to obtain solutions suitable for flow coating on aluminum panels. All films, ranging from 0.5 to 2 mils in thickness, were cured 40 minutes at 175° C. and then tested as follows:

| Test | Example | | | |
|---|---|---|---|---|
| | II | III | IV | V |
| Hardness [1] | 2H | 3H | 4H | 1H. |
| Flexibility and adhesion [2] | Cracked and checked | Pass | Pass | Pass. |
| Oil Repellency [3] | Pass | do | do | Do. |

[1] The hardest lead pencil which fails to scratch the surface.
[2] The panel was creased to a sharp 180° bend and the film was then examined for cracking and peeling.
[3] Test whether droplets of oil (a 70 : 30 mineral oil : n-heptane volume ratio) remain localized and drain from surface without leaving perceptible trail when panel is inclined at 30°.

The amount of fluorine present in the copolymer in the form of perfluorocarbon tails that is necessary to produce oleophobicity to a treated surface can be demonstrated by measurement and comparison of contact angles. The contact angle is determined by placing a drop of hexadecane on a smooth nonporous surface treated with a solution of the copolymer of this invention. If the contact angle of the drop of oil is less than 30° the surface is considered to be wetted by the oil since the oil leaves a perceptible trail as indicated above in note (3). If the contact angle is above 40°, the treated surface is considered oleophobic. The following is a comparison of the oleophobicity of several copolymers.

| Copolymer: | Contact angle |
|---|---|
| Example I.—15% F | 64 |
| Example II.—15% F | 50 |
| Example IV.—1.2% F | 40 |
| Example V.—15% F | 61 |
| Control of Example I.—0% F | 24 |
| Homopolymer of N-ethyl perfluorooctanesulfonamidoethyl methacrylate | 65 |

*Examples VI to VIII*

Fluorocarbon containing resins of this invention were prepared by copolymerizing N-ethyl perfluorooctanesulfonamidoethyl methacrylate with octadecyl methacrylate in the proportion shown and with the solubility results indicated in the table below. The polymerization was effected with the monomers dissolved in 1,1,1,-trichloroethane at a temperature of 75° C. utilizing 1 part by weight of tertiary dodecyl mercaptan and 0.5 part by weight of benzoyl peroxide as the catalyst.

| | Fluorocarbon monomer | Acrylate Comonomer | Percent Fluorine | Solubility in Zylene |
|---|---|---|---|---|
| Example VI | 80 | 20 | 40 | Insoluble. |
| Example VII | 75 | 25 | 37.5 | Soluble. |
| Example VIII | 70 | 30 | 35 | Do. |

As indicated above copolymers containing 40 percent or more of fluorine are insoluble in nonhalogenated solvents such as xylene. With such copolymers which are not cross-linkable because of the absence of the functional monomer unit, larger amounts of the fluorocarbon monomer can be utilized in the system and, as indicated above, as much as 75 percent fluorocarbon monomer. The above copolymers are particularly useful for application to textiles to render such textiles oil repellent when deposited on the textile in a 1 percent concentration based on weight of fabric.

The compositions of this invention may be used alone as coating compositions for the treatment of surfaces or in combination with other resins. They may be applied by known flow, dip-coating and spray techniques. Resins especially suitable for use in combination with the resins of this invention are phenol-formaldehyde, epoxy, melamine-formaldehyde, urea-formaldehyde, cellulosics, vinyls, polyesters and acrylics.

Among the beneficial properties imparted to surfaces treated with the compositions of this invention are oil and water repellency and reduced adhesion to waxes, asphalts, glues, dirt and similar materials. Lower coefficients of friction are also realized, which serve to reduce the erosion of the coating under abrasive stresses.

Specific uses of the hard flexible compositions of this invention include their use as mold release agents, corrosion resistant coatings, anti-fouling liners for chemical reactors and pipe lines, paint additives and so forth.

As employed in coating compositions, the compositions of this invention make possible a surface which is oil resistant and does not soil in a manner comparable to the same untreated surface. The compositions of this invention have many outstanding properties and they may be used in any of the various applications for which the material known to the prior art have been utilized. Thus, they can be used as impregnants for textile fabrics, as appliance enamels, as automobile lacquers or enamels, as coatings on pipes, chemical reactors and industrial processing rolls. The coatings are characterized by high degrees of hardness, flexibility, adhesion, impact resistance, electrical insulation properties, abrasion resistance, acid resistance and salt spray resistance. As such, they have excellent outdoor aging durability, and an ability to impart outstanding surface properties to various substrates, i.e. low coefficient of friction and outstanding repellency to aqueous and organic media. Illustrative substrates are metals, wood, glass, textiles, leather and concrete. Thus, they offer great advantage in use as appliance and automotive enamels in view of their unique resistance to such staining agents as strong detergent solutions, grease and asphaltic materials. Salt spray resistance is also outstanding. These unique surface characteristics also serve to make these resins extremely useful as mold release agents, as well as coatings on industrial rolls in applications where it is desirable to prevent accumulation of materials which would otherwise adhere tenaciously, such as in the wax coating of paper or paperboard and in the starch or glue sizing of textiles. These resins can be used in wood varnishes, lacquers or paints to prevent staining of woodwork or furniture. They are useful as pipe coatings for reducing corrosion and minimizing the deposition of solid materials which adhere to the pipe walls (e.g. wax deposition in petroleum pipe lines). They are useful both as corrosion resistant and anti-fouling coatings in chemical reactors. Thus, an ethylene or propylene polymerization reactor may be coated with these resins to prevent accumulation of tenaciously adhering polymer on the reactor where the accumulations (foulings) on the walls would otherwise impair the heat transfer characteristics of the reactor.

We claim:
1. A nonfluorinated organic solvent soluble fluorocarbon precondensate resin reactable with formaldehyde containing at least 1 percent fluorine in form of perfluorocarbon tails and comprising (1) about 2 to about 50 percent by weight of monomeric units of the monomer $R_fP$, where $R_f$ is a perfluorocarbon radical containing at least 4 carbon atoms and P is a polymerizable group containing terminal ethylenic unsaturation, (2) about 1 to about 25 percent by weight of monomeric units of an ethylenically unsaturated monomer containing a functional group reactable with formaldehyde and (3) about 25 to about 97 percent by weight of monomeric units different from (2) above of an ethylenically unsaturated monomer free of nonvinylic fluorine, the fluorine content of the appendant perfluorocarbon $R_f$ tails of the copolymer representing at least 1 percent and less than 40 percent by weight of the copolymer, the backbone of the copolymer being substantially entirely carbon with at least half of the substituents being hydrogen, a radical having an unsubstituted alkyl group of not greater than 6 carbon atoms or both, and the copolymer having a molecular weight between about 20,000 and about 500,000.

2. An organic solution in a nonfluorinated organic solvent of a random fluorocarbon copolymer of between about 2 and about 75 weight percent of a monomer of the formula $R_fP$, where $R_f$ is a perfluorocarbon radical containing at least 4 carbon atoms and P is a polymerizable group containing terminal ethylenic unsaturation and of a terminally ethylenically unsaturated monomer free of nonvinylic fluorine, the fluorine content of the appendant perfluorocarbon $R_f$ tails of the copolymer representing at least 1 percent and less than 40 percent by weight of the copolymer, the backbone of the copolymer being substantially entirely carbon with at least half of the substituents being hydrogen, a radical having an unsubstituted alkyl group of not greater than 6 carbon atoms or both, and the copolymer having a molecular weight of at least 20,000.

3. A textile fabric which has been coated with the organic solution of claim 2.

4. A thermosetting precondensate resin of claim 1 which contains a

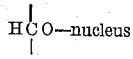

attached to the functional group of monomer (2).

5. A thermoset precondensate resin of claim 1 which is crosslinked through an

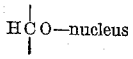

attached to the functional group of monomer (2).

6. The thermoset precondensate resin of claim 5 in which the crosslinking bridge is derived from formaldehyde.

7. The precondensate resin of claim 1 in which monomer (2) is acrylamide.

8. The precondensate resin of claim 1 in which the monomer $R_fP$ is an acrylate or methacrylate.

9. The precondensate resin of claim 1 in which the monomer (3) is an alkyl acrylate or methacrylate.

References Cited
UNITED STATES PATENTS

| | | | |
|---|---|---|---|
| 2,642,416 | 6/1953 | Ahlbrecht et al. | 260—83.5 |
| 2,803,615 | 8/1957 | Ahlbrecht et al. | 260—29.6 |
| 3,037,963 | 6/1962 | Christenson | 260—72 |
| 3,198,770 | 8/1965 | Watkins | 260—77.5 |

WILLIAM H. SHORT, *Primary Examiner.*

SAMUEL H. BLECH, *Examiner.*

H. E. SCHAIN, *Assistant Examiner.*